(12) United States Patent
Qi et al.

(10) Patent No.: US 10,277,864 B2
(45) Date of Patent: Apr. 30, 2019

(54) METHOD AND SYSTEM FOR AUTOMATICALLY CORRECTING FRAME ANGLE IN MOBILE TERMINAL VIDEO COMMUNICATION

(71) Applicant: HUIZHOU TCL MOBILE COMMUNICATION CO., LTD., Hui Zhou (CN)

(72) Inventors: Dongjing Qi, Hui Zhou (CN); Guokuan Fang, Hui Zhou (CN)

(73) Assignee: HUIZHOU TCL MOBILE COMMUNICATION CO., LTD., Hui Zhou (CN)

( * ) Notice: Subject to any disclaimer, the term of this patent is extended or adjusted under 35 U.S.C. 154(b) by 0 days.

(21) Appl. No.: 15/769,327

(22) PCT Filed: Dec. 2, 2016

(86) PCT No.: PCT/CN2016/108355
§ 371 (c)(1),
(2) Date: Apr. 18, 2018

(87) PCT Pub. No.: WO2017/181686
PCT Pub. Date: Oct. 26, 2017

(65) Prior Publication Data
US 2018/0227542 A1   Aug. 9, 2018

(30) Foreign Application Priority Data
Apr. 22, 2016   (CN) .......................... 2016 1 0253310

(51) Int. Cl.
*H04N 7/14* (2006.01)
*H04M 1/725* (2006.01)
*G06F 1/16* (2006.01)

(52) U.S. Cl.
CPC .......... *H04N 7/144* (2013.01); *G06F 1/1613* (2013.01); *H04M 1/72569* (2013.01);
(Continued)

(58) Field of Classification Search
USPC ........................................................ 455/404
See application file for complete search history.

(56) References Cited

U.S. PATENT DOCUMENTS

| | | | |
|---|---|---|---|
| 2012/0019674 A1* | 1/2012 | Ohnishi | G08C 17/00 348/207.1 |
| 2013/0222516 A1 | 8/2013 | Do et al. | |
| 2016/0035096 A1* | 2/2016 | Rudow | G01S 19/25 348/135 |

FOREIGN PATENT DOCUMENTS

| | | | |
|---|---|---|---|
| CN | 103118242 A | 5/2013 | |
| CN | 103763505 A | 4/2014 | |

(Continued)

OTHER PUBLICATIONS

International Search Report, PCT/CN2016/108355, dated Mar. 9, 2017.

*Primary Examiner* — Maria El-Zoobi
(74) *Attorney, Agent, or Firm* — Shimokaji IP

(57) ABSTRACT

A method and system for automatically correcting an image orientation in mobile terminal video communication by calculating a first angle of deflection between a first mobile terminal and a second mobile terminal, calculating a second angle of deflection for rotating a first image displayed on the first mobile terminal, and a third angle of deflection for rotating a second image displayed on the second mobile terminal.

20 Claims, 6 Drawing Sheets

(52) U.S. Cl.
CPC ........ *H04N 7/147* (2013.01); *H04M 2250/52* (2013.01); *H04N 2007/145* (2013.01)

(56) References Cited

FOREIGN PATENT DOCUMENTS

| | | |
|---|---|---|
| CN | 104243830 A | 12/2014 |
| CN | 104243955 A | 12/2014 |
| CN | 105959612 A | 9/2016 |
| KR | 20130081800 A | 7/2013 |

\* cited by examiner

METHOD AND SYSTEM FOR AUTOMATICALLY CORRECTING FRAME ANGLE IN MOBILE TERMINAL VIDEO COMMUNICATION

FIELD OF THE INVENTION

The present invention relates to the technical field of mobile terminals. In particular, it relates to a method and system for automatically correcting image orientation in mobile terminal video communication.

BACKGROUND

With the developments in mobile communications, mobile phones have become an indispensable communication tool in people's everyday life. The intelligent terminal data wireless transmission speed has been greatly increased. Accordingly, the video communication functions in many social software products, such as Wechat/QQ/SKYPE/MSN, have been widely used. In a two-party video chat or a multiple-party video chat, if the terminals used in the communication are not in the same orientation, for example, when users are using mobile phones in video communication, in which a user's mobile phone is in vertical orientation while another user's mobile phone is in horizontal orientation, for each user, the image of the user and the image of the other party shown on the screen of the user's mobile phone will have angle of 90 degrees, which significantly affects user experience. Although some social software, such as QQ, allows a user to manually adjust the video image's orientation, such function only enables a user to adjust the orientation of the user's own image shown on the screen of the user's terminal, but cannot adjust the orientation of the image of the other part shown on the screen of the user's terminal. Therefore, such problem makes it inconvenient for a user to have video communication with the terminal.

Thus, the currently technology in the field needs further improvements.

SUMMARY OF THE INVENTION

The present invention provides method and system for automatically correcting image orientation in mobile terminal video communication. It intends to solve the technical problem as follows: in the existing technology, a social software product only allows a user to adjust the orientation of the user's own image, but does not allow the user to adjust the orientation of the image of the other party shown on the user's terminal, which makes it inconvenient for a user to have video communication with the terminal. These problems are solved by the technical solution set forth below.

In an exemplary implementation, a method for automatically correcting an image orientation in a mobile terminal video communication, the method comprising: establishing video communication between a first mobile terminal and a second mobile terminal; respectively obtaining first position data of the current first mobile terminal and second position data of the current second mobile terminal, and sending the first position data and the second position data to a background server; when determining that the first position data are different from the second position data, calculating a first angle of deflection between the first mobile terminal and the second mobile terminal; calculating a second angle of deflection to be rotated for a first image in the first mobile terminal and a third angle of deflection to be rotated for a second image in the second mobile terminal according to a normal image orientation and the first angle of deflection, and then adjusting by rotating the first image in the first mobile terminal according to the second angle of deflection, and adjusting by rotating the second image in the second mobile terminal according to the third angle of deflection, wherein the normal image orientation is opposite to a gravity direction; and controlling the first mobile terminal and the second mobile terminal to respectively display the adjusted images.

In an exemplary implementation, the step of establishing video communication between a first mobile terminal and a second mobile terminal comprises: the first mobile terminal accessing a video communication interface via social software, and sending a video connection request to the second mobile terminal; and upon detecting that the second mobile terminal receives the video connection request, controlling to open a camera of the first mobile terminal and a camera of the second mobile terminal to establish the video communication.

In an exemplary implementation, the first position data is selected from the group consisting of a left horizontal direction, a right horizontal direction, a vertical direction and an inverted direction; and the second position data is selected from the group consisting of a left horizontal direction, a right horizontal direction, a vertical direction and an inverted direction.

In an exemplary implementation, the step of respectively obtaining first position data of the current first mobile terminal and second position data of the current second mobile terminal, and sending the first position data and the second position data to a background server comprises: obtaining the first position data of the current first mobile terminal through a gravity sensor of the first mobile terminal, and obtaining the second position data of the current second mobile terminal through a gravity sensor of the second mobile terminal; when the first mobile terminal is unable to identify the specific position data contained in the obtained first position data, determining that the first position data is the first position data identified last time; when the second mobile terminal is unable to identify the specific position data contained in the obtained second position data, determining that the second position data is the second position data identified last time; controlling the first mobile terminal to send the first position data to the background server, and controlling the second mobile terminal to send the second position data to the background server.

In an exemplary implementation, the step of respectively obtaining first position data of the current first mobile terminal and second position data of the current second mobile terminal comprises: when the first position data obtained by the first mobile terminal is a horizontal position, determining that the first position data is the first position data identified last time; when the second position data obtained by the second mobile terminal is a horizontal position, determining that the second position data is the second position data identified last time.

In an exemplary implementation, the first image refers to an image of a second user corresponding to the second mobile terminal, and the second image refers to an image of a first user corresponding to the first mobile terminal.

In an exemplary implementation, the left horizontal direction, the right horizontal direction, the vertical direction and the inverted direction are preset directions.

In an exemplary implementation, a method for automatically correcting an image orientation in a mobile terminal video communication, the method comprising: establishing video communication between a first mobile terminal and a second mobile terminal; respectively obtaining first position data of the current first mobile terminal and second position data of the current second mobile terminal, and sending the first position data and the second position data to a background server; determining whether the first position data and the second position data are the same, and if the first position data and the second position data are not the same, calculating a first angle of deflection between the first mobile terminal and the second mobile terminal; calculating a second angle of deflection to be rotated for a first image in the first mobile terminal and a third angle of deflection to be rotated for a second image in the second mobile terminal according to a normal image orientation, and then adjusting by rotating the first image in the first mobile terminal according to the second angle of deflection, and adjusting by rotating the second image in the second mobile terminal according to the third angle of deflection; and controlling the first mobile terminal and the second mobile terminal to respectively display the adjusted images.

In an exemplary implementation, the step of establishing video communication between a first mobile terminal and a second mobile terminal comprises: the first mobile terminal accessing a video communication interface via social software, and sending a video connection request to the second mobile terminal; and upon detecting that the second mobile terminal receives the video connection request, controlling to open a camera of the first mobile terminal and a camera of the second mobile terminal to establish the video communication.

In an exemplary implementation, the first position data is selected from the group consisting of a left horizontal direction, a right horizontal direction, a vertical direction and an inverted direction; and the second position data is selected from the group consisting of a left horizontal direction, a right horizontal direction, a vertical direction and an inverted direction.

In an exemplary implementation, the step of respectively obtaining first position data of the current first mobile terminal and second position data of the current second mobile terminal, and sending the first position data and the second position data to a background server comprises: obtaining the first position data of the current first mobile terminal through a gravity sensor of the first mobile terminal, and obtaining the second position data of the current second mobile terminal through a gravity sensor of the second mobile terminal; when the first mobile terminal is unable to identify the specific position data contained in the obtained first position data, determining that the first position data is the first position data identified last time; when the second mobile terminal is unable to identify the specific position data contained in the obtained second position data, determining that the second position data is the second position data identified last time; controlling the first mobile terminal to send the first position data to the background server, and controlling the second mobile terminal to send the second position data to the background server.

In an exemplary implementation, the step of respectively obtaining first position data of the current first mobile terminal and second position data of the current second mobile terminal comprises: when the first position data obtained by the first mobile terminal is a horizontal position, determining that the first position data is the first position data identified last time; when the second position data obtained by the second mobile terminal is a horizontal position, determining that the second position data is the second position data identified last time.

In an exemplary implementation, the first image refers to an image of a second user corresponding to the second mobile terminal, and the second image refers to an image of a first user corresponding to the first mobile terminal.

In an exemplary implementation, the left horizontal direction, the right horizontal direction, the vertical direction and the inverted direction are preset directions.

In an exemplary implementation, a system for automatically correcting an image orientation in a mobile terminal video communication, the system comprising: a video communication establishing module, which is used for establishing video communication between a first mobile terminal and a second mobile terminal; a position data obtaining module, which is used for respectively obtaining first position data of the current first mobile terminal and second position data of the current second mobile terminal, and sending the first position data and the second position data to a background server; a determining and calculating module, which is used for determining whether the first position data and the second position data are the same, and if the first position data and the second position data are not the same, calculating a first angle of deflection between the first mobile terminal and the second mobile terminal; a rotation adjusting module, which is used for calculating a second angle of deflection to be rotated for a first image in the first mobile terminal and a third angle of deflection to be rotated for a second image in the second mobile terminal according to a normal image orientation, and then adjusting by rotating the first image in the first mobile terminal according to the second angle of deflection, and adjusting by rotating the second image in the second mobile terminal according to the third angle of deflection; and an image displaying module, which is sued for controlling the first mobile terminal and the second mobile terminal to respectively display the adjusted images.

In an exemplary implementation, the video communication establishing module comprises: a video connection requesting unit, which is used for enabling the first mobile terminal to access a video communication interface via social software and send a video connection request to the second mobile terminal; and a video communication unit, which is used for detecting that the second mobile terminal receives the video connection request, controlling to open a camera of the first mobile terminal and a camera of the second mobile terminal to establish the video communication.

In an exemplary implementation, the first position data is selected from the group consisting of a left horizontal direction, a right horizontal direction, a vertical direction and an inverted direction; and the second position data is selected from the group consisting of a left horizontal direction, a right horizontal direction, a vertical direction and an inverted direction.

In an exemplary implementation, the position data obtaining module comprises: a position data obtaining unit, which is used for obtaining the first position data of the current first mobile terminal through a gravity sensor of the first mobile terminal, and obtaining the second position data of the current second mobile terminal through a gravity sensor of the second mobile terminal; a first determining unit, which is used for when the first mobile terminal is unable to identify the specific position data contained in the obtained first position data, determining that the first position data is the first position data identified last time; a second determining unit, which is used for when the second mobile terminal is unable to identify the specific position data contained in the obtained second position data, determining that the second position data is the second position data identified last time; and a position data sending unit, which is used for controlling the first mobile terminal to send the first position data to the background server, and controlling the second mobile terminal to send the second position data to the background server.

In an exemplary implementation, the first determining unit is further used for, when the first position data obtained by the first mobile terminal is a horizontal position, determining that the first position data is the first position data identified last time; the second determining unit is further used for, when the second position data obtained by the second mobile terminal is a horizontal position, determining that the second position data is the second position data identified last time.

In an exemplary implementation, the first image refers to an image of a second user corresponding to the second mobile terminal, and the second image refers to an image of a first user corresponding to the first mobile terminal.

The exemplary implementations provide a method and system for automatically correcting an image orientation in mobile terminal video communication. The present invention detects the orientations of all terminals through gravity sensing, calculate the angle needed for a user's terminal to display an image in normal orientation, and then adjust the image orientation shown on the screen of the user's terminal, so as to allow the terminal of each user to display images in normal orientation, which make it convenient for users to have video communication with their mobile terminals.

DETAILED DESCRIPTION

The exemplary implementations provide a method for automatically correcting an image orientation in mobile terminal video communication. In order to make the object, technical solutions and effects of the present invention more clear and definite, the present invention will now be described in more detail. It is to be understood that the specific embodiments described herein are merely describing the invention, and are not intended to limit the present invention.

Figure 1:
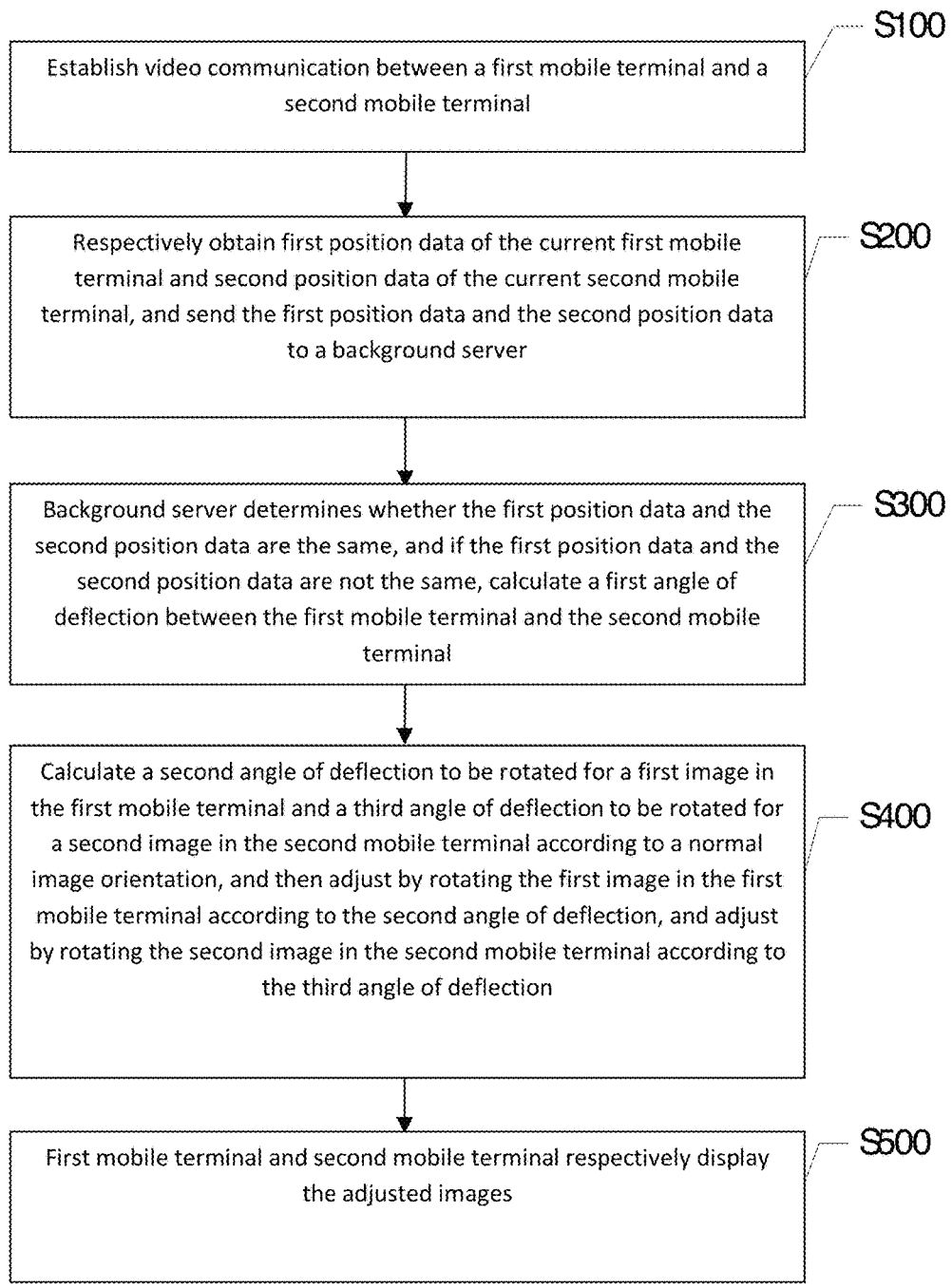
FIG. 1 is a flow chart showing an exemplary method for automatically correcting an image orientation in mobile terminal video communication.

FIG. 1 is a flow chart showing an exemplary method for automatically correcting an image orientation in mobile terminal video communication.

Step S100, establish video communication between a first mobile terminal and a second mobile terminal.

Step S200, respectively obtain first position data of the current first mobile terminal and second position data of the current second mobile terminal, and send the first position data and the second position data to a background serve.

Step 300, background server determines whether the first position data and the second position data are the same, and if the first position data and the second position data are not the same, calculate a first angle of deflection between the first mobile terminal and the second mobile terminal.

Step 400, Calculate a second angle of deflection to be rotated for a first image in the first mobile terminal and a third angle of deflection to be rotated for a second image in the second mobile terminal according to a normal image orientation, and then adjust by rotating the first image in the first mobile terminal according to the second angle of deflection, and adjust by rotating the second image in the second mobile terminal according to the third angle of deflection.

Step 500, first mobile terminal and second mobile terminal respectively display the adjusted images.

When implementing the exemplary method, the first mobile terminal in step S100 includes, but is not limited to, smart phone, tablet computer and other types of terminals; and the second mobile terminal also includes, but is not limited to, smart phone, tablet computer and other types of terminals.

Figure 2A:
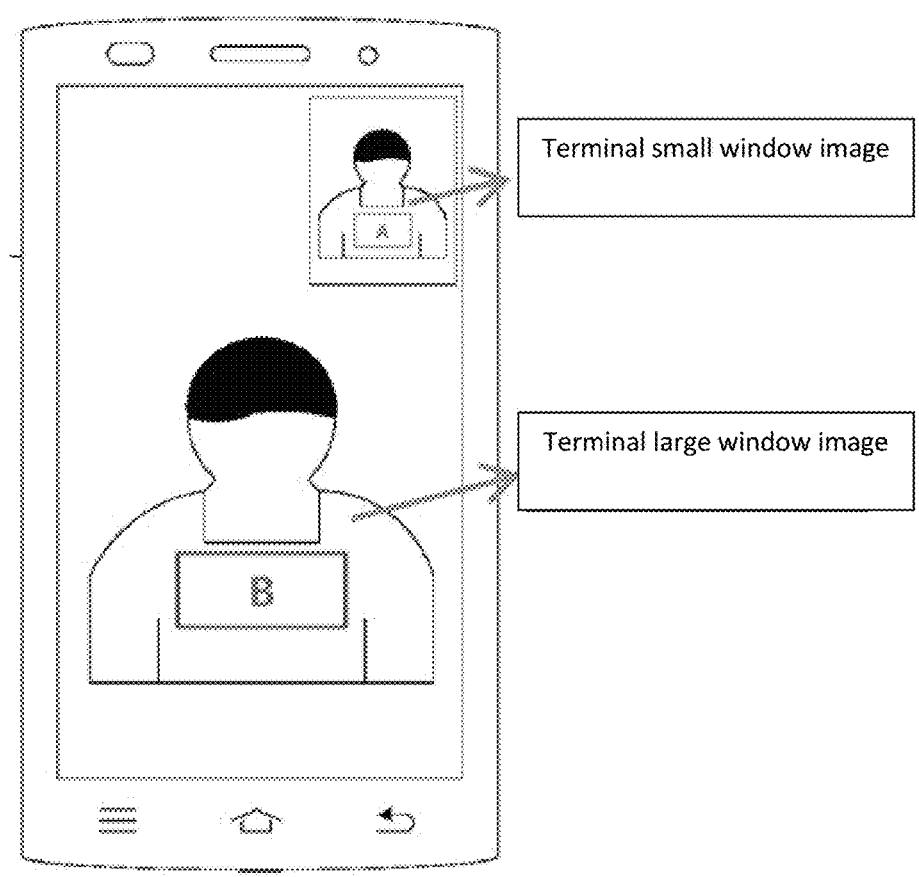
FIG. 2a is a view of an exemplary interface of video communication of a first mobile terminal.
Figure 2B:
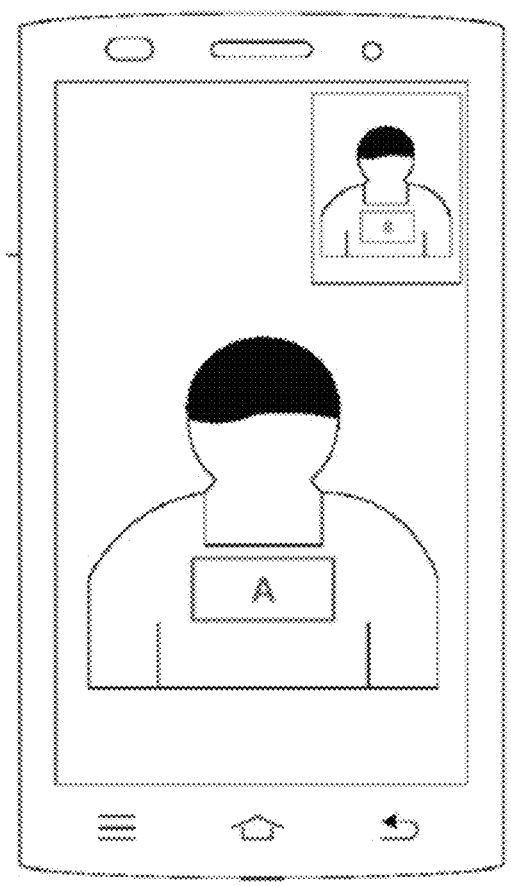
FIG. 2b is a view of an exemplary interface of video communication of a second mobile terminal.

Following establishing the video communication between the first and second mobile terminals, as shown in FIG. 2a and FIG. 2b, as shown on the terminal A, the big window image is the other party in the communication, and the small window image is the user of the terminal A. As shown on the terminal B, the big window image is the other party in the communication, and the small window image is the user of the terminal B. In the case when the two terminals are in the same orientation, no rotation or adjustment is needed (the big window and small window can be freely switched by the user, which is not going to affect the implementation of the exemplary method, as described below).

In step S200, the first position data is one of the following positions: a left horizontal direction, a right horizontal direction, a vertical direction, or an inverted direction. The second position data is one of the following positions: a left horizontal direction, a right horizontal direction, a vertical direction, or an inverted direction. The foregoing left horizontal direction, right horizontal direction, vertical direction, and inverted direction are all preset directions. A user is allowed to define them according to actual needs.

For example, when the mobile phone is perpendicular to the sight direction of the user, and marks of the keys of the mobile phone, such as the HOME key, is in a normal orientation, the mobile phone orientation is in a vertical direction. When the mobile phone is perpendicular to the sight direction of the user, and marks of the keys of the mobile phone, such as the HOME key, are in an inverted orientation, the mobile phone orientation is in an inverted direction. When the mobile phone is in a vertical direction, and then is rotated towards the left side of the mobile phone for 90 degrees, the direction of the mobile phone becomes the left horizontal direction. When the mobile phone is in a vertical direction, and then is rotated towards the right side of the mobile phone 90 degrees, the direction of the mobile phone becomes the right horizontal direction.

In step S300, in the case when the background server determines that the positions of the two mobile terminals are the same, the terminals are allowed to display their current images without change, no rotating adjustment is necessary. While in the case when the background server determines that the positions of the two mobile terminals are different, if the large window on the terminal cannot be rotated, the large window seen by the user will not be in an orientation that is 90 degrees or 180 degrees from the normal orientation. While the user desires a normal orientation. In this case, the background server will calculate an angle of deflection a between the two mobile terminals.

Figure 3A:
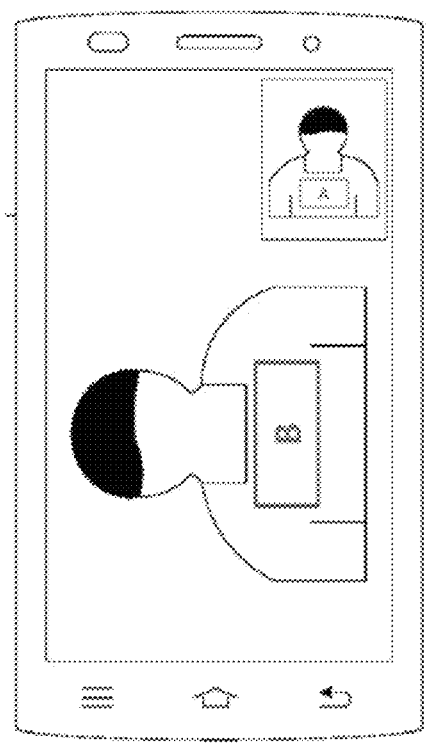
FIG. 3a is a view of an exemplary interface of video communication of a first mobile terminal.
Figure 3B:
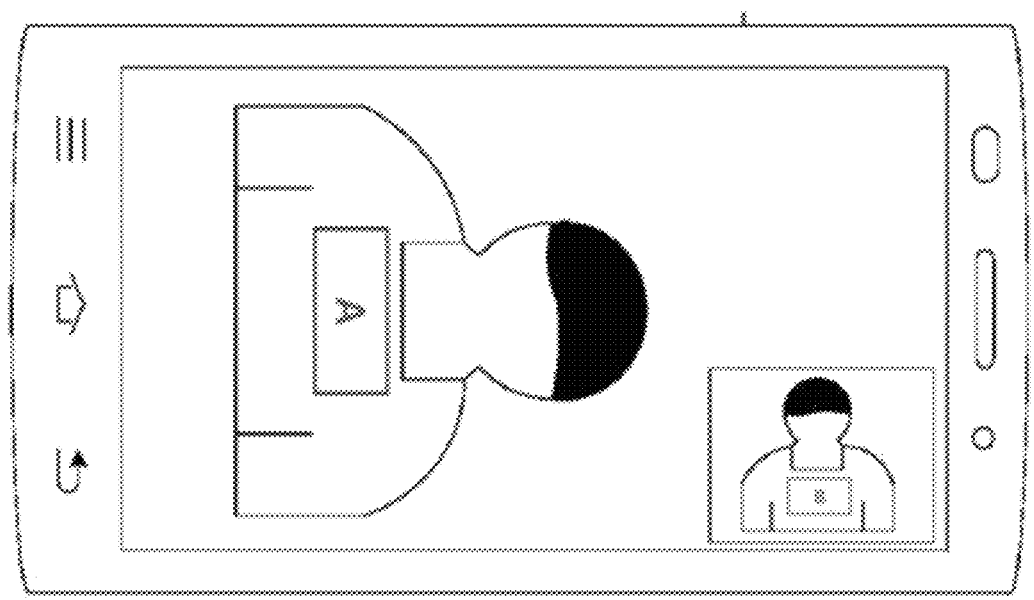
FIG. 3b is a view of an exemplary interface of video communication of a second mobile terminal.

In step S400, the first image refers to an image of the second user corresponding to the second mobile terminal, and the second image refers to an image of the first user corresponding to the first mobile terminal. According to the requirement for a normal orientation, an angle β and an angle γ are calculated to be rotated respectively for the big window image on terminal A and the big window image on terminal B. Then the terminal large window images will be rotated according to the angle β and angle γ, respectively. As shown in FIG. 3a and FIG. 3b, the terminal A is in a vertical direction, while the terminal B is in a right horizontal direction. In this case, the image of B shown on terminal A is rotated 90 degrees to the left, and the image of A shown in terminal B is rotated 90 degrees to the right. As a result, both the terminal A and the terminal B use the opposite direction to the gravity direction as the direction of normal orientation, and accordingly, the image of B shown on terminal A must be rotated 90 degrees to the right, and the image of A shown on terminal B must be rotated 90 degrees to the left.

Figure 4A:
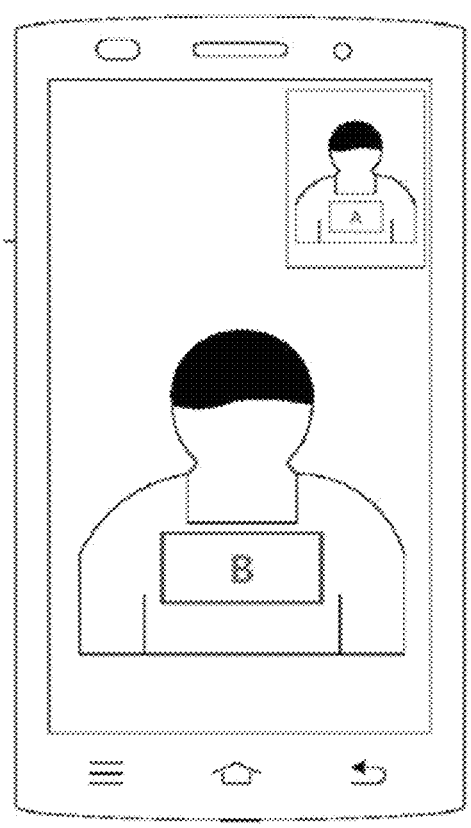
FIG. 4a is a view of an exemplary adjusted interface of video communication of a first mobile terminal.
Figure 4B:
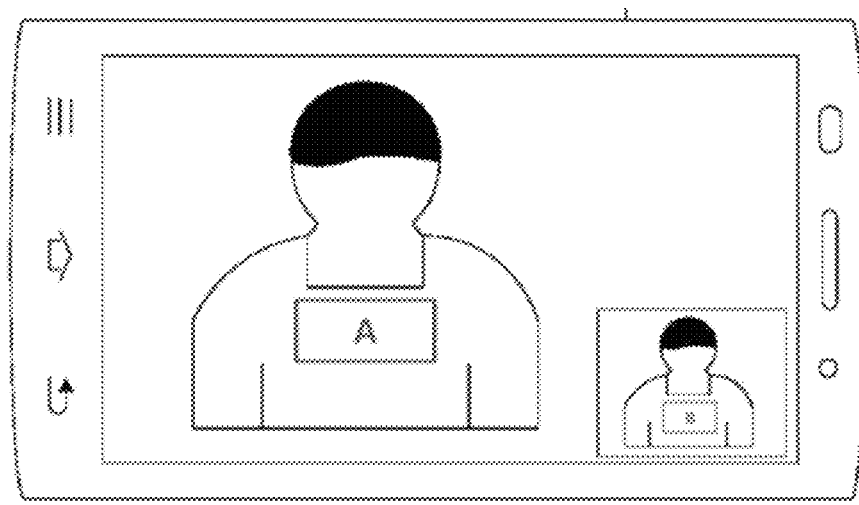
FIG. 4b is a view of an exemplary adjusted interface of video communication.

In Step S500, as shown in FIG. 4a and FIG. 4b, by way of adjusting the orientation of the large window image shown on the screen of each terminal, in the video communication, each user can see an image in normal orientation from the user's terminal. Through the exemplary automatic correcting method, video communication becomes more convenient for a user, as during the video communication process, the user is allowed to place the mobile terminal in a way meeting the user's actual needs without effecting the orientation of the image shown on the terminal.

Referring back to FIG. 1, step S100 further includes the additional steps (not shown) described below.

Step S101, the first mobile terminal accesses a video communication interface via social software, and sends a video connection request to the second mobile terminal.

Step 102, upon detecting that the second mobile terminal receives the video connection request, control to open a camera of the first mobile terminal and a camera of the second mobile terminal to establish the video communication.

Specifically, in an exemplary implementation, both user A and user B access the video communication interface through social software, such as Wechat/QQ/SKYPE and the like, wherein the mobile terminal used by user A is named as the first mobile terminal, and the first mobile terminal is referred to as terminal A. The mobile terminal used by user B is named as the second mobile terminal, and the second mobile terminal is referred to as terminal B. The two terminals are used in a two-party video communication or multiple-party video communication. The cameras of the intelligent terminals of user A and user B have been opened, and video communication is established between user A and user B, in which the two users can see the image taken by the other party's camera.

Referring back to FIG. 1, step S200 further includes the additional steps (not shown) described below.

Step S201, a gravity sensor in the first mobile terminal obtains the first position data of the current first mobile terminal, and a gravity sensor in the second mobile terminal obtains the second position data of the current second mobile terminal.

Step S202, when the first mobile terminal is unable to identify the specific position data contained in the obtained first position data, it is determined that the first position data is the first position data identified last time.

Step S203, when the second mobile terminal is unable to identify the specific position data contained in the obtained second position data, it is determined that the second position data is the second position data identified last time.

Step S204, the first mobile terminal sends the first position data to the background server, and the second mobile terminal sends the second position data to the background server.

Specifically, in an exemplary implementation, a gravity sensor is able to detect the respective positions of the terminal A and the terminal B, for example, in a left horizontal direction, a right horizontal direction, a vertical direction, or an inverted direction. In addition, in the case when a terminal is in an un-determinable direction, the position will be determined as the previous position. Moreover, terminal A and terminal B exchange their terminal position information via network.

An exemplary implementation can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, which can be used to execute the method described above.

An exemplary implementation can include a non-transitory computer readable storage medium comprising instructions, such as a memory comprising instructions, which may be executed by a processor of the device to accomplish the above-described method. For example, non-transitory computer readable storage medium may be a ROM, a random-access memory (RAM), a CD-ROM, a magnetic tape, a floppy disk, an optical data storage device and the like.

Figure 5:
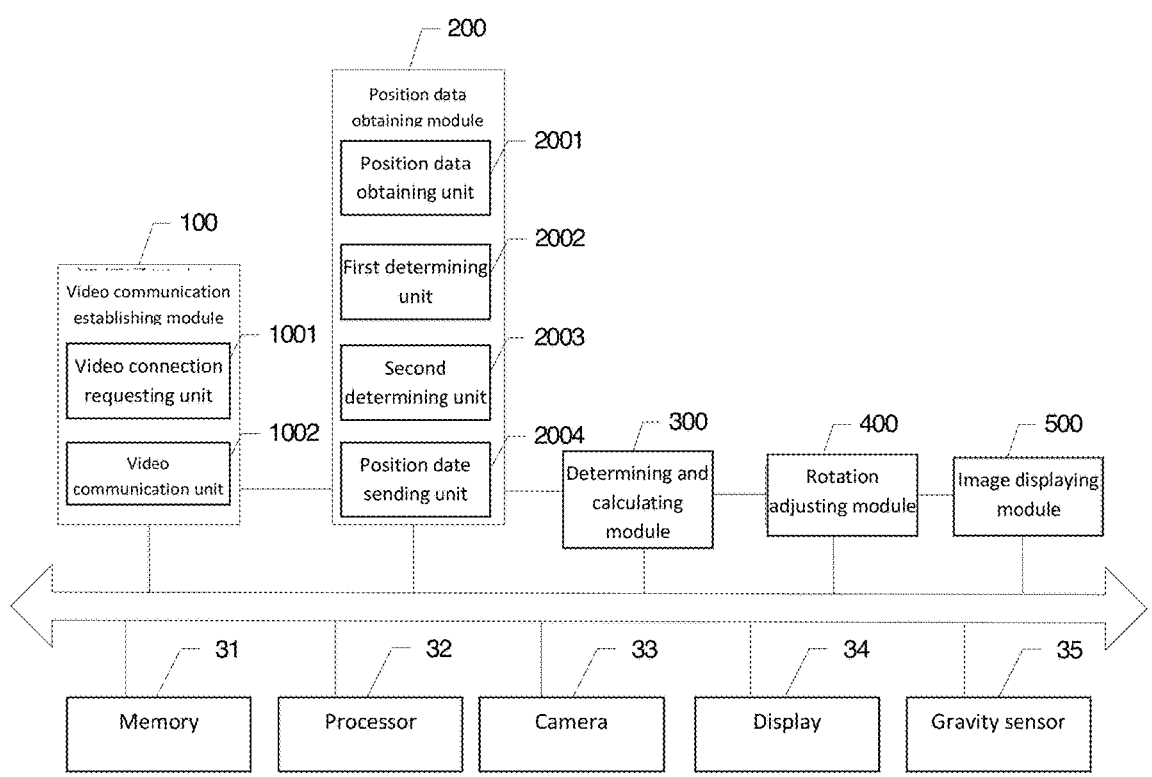
FIG. 5 is a block diagram of an exemplary system for automatically correcting an image orientation in mobile terminal video communication.

FIG. 5 is a block diagram showing an exemplary system for automatically correcting an image orientation in mobile terminal video communication according to the present invention. Please refer to the above-discussion of the method for more details regarding the operations of the various modules.

A video communication establishing module 100 is used for establishing video communication between a first mobile terminal and a second mobile terminal.

A position data obtaining module 200 is used for respectively obtaining first position data of the current first mobile terminal and second position data of the current second mobile terminal, and sending the first position data and the second position data to a background server.

A determining and calculating module 300 is used for determining whether the first position data and the second position data are the same, and if the first position data and the second position data are not the same, calculating a first angle of deflection between the first mobile terminal and the second mobile terminal.

A rotation adjusting module 400 is used for calculating a second angle of deflection to be rotated for a first image in the first mobile terminal and a third angle of deflection to be rotated for a second image in the second mobile terminal according to a normal image orientation, and then adjusting by rotating the first image in the first mobile terminal according to the second angle of deflection, and adjusting by rotating the second image in the second mobile terminal according to the third angle of deflection.

An image displaying module 500 is sued for controlling the first mobile terminal and the second mobile terminal to respectively display the adjusted images.

As shown in FIG. 5, the video communication establishing module 100 can include various sub-modules as discussed below.

The video communication establishing module 100 can also include a video connection requesting unit 1001, which is used for enabling the first mobile terminal to access a video communication interface via social software and send a video connection request to the second mobile terminal.

The video communication establishing module 100 can also include a video communication unit 1002, which is used for detecting that the second mobile terminal receives the video connection request, controlling to open a camera of the first mobile terminal and a camera of the second mobile terminal to establish the video communication.

Preferably, the first position data is selected from the group consisting of a left horizontal direction, a right horizontal direction, a vertical direction and an inverted direction, and the second position data is selected from the group consisting of a left horizontal direction, a right horizontal direction, a vertical direction and an inverted direction.

As shown in FIG. 5, the position data obtaining module 200 can include various sub-modules as discussed below.

A position data obtaining unit 2001 is used for obtaining the first position data of the current first mobile terminal through a gravity sensor of the first mobile terminal, and obtaining the second position data of the current second mobile terminal through a gravity sensor of the second mobile terminal.

A first determining unit 2002 is used for when the first mobile terminal is unable to identify the specific position data contained in the obtained first position data, determining that the first position data is the first position data identified last time.

A second determining unit 2003 is used for when the second mobile terminal is unable to identify the specific position data contained in the obtained second position data, determining that the second position data is the second position data identified last time.

A position data sending unit 2004 is used for controlling the first mobile terminal to send the first position data to the background server, and controlling the second mobile terminal to send the second position data to the background server.

Preferably, the first image refers to an image of a second user corresponding to the second mobile terminal, and the second image refers to an image of a first user corresponding to the first mobile terminal, please refer to the embodiment of the method provided above for more details.

The memory 31 can be used to store software programs and modules. The processor 32 can implement various functional applications of a mobile phone and process data by executing the software programs and modules stored in the memory 31.

The camera 33 can be used to acquire a video image for the mobile terminal when establishing video communication.

The display 34 can be used to display a video image.

The gravity sensor can be used to obtain position data of the mobile terminal.

In an exemplary implementation, the processor 32 in the system loads the executable program code corresponding to the process of one or more applications into the memory 31 according to the corresponding instruction, and the processor 32 executes the application program stored in the memory 31, so as to implement the method for automatically correcting an image orientation in a mobile terminal video communication, or run the system for automatically correcting an image orientation in a mobile terminal video communication, thereby achieving the corresponding functions.

In summary, the exemplary implementations provide a method and system for automatically correcting an image orientation in mobile terminal video communication. The method comprises: establishing video communication between a first mobile terminal and a second mobile terminal; respectively obtaining first position data of the current first mobile terminal and second position data of the current second mobile terminal, and sending the first position data and the second position data to a background server; when the background server determines that the first position data are different from the second position data, calculating a first angle of deflection between the first mobile terminal and the second mobile terminal; calculating a second angle of deflection to be rotated for a first image in the first mobile terminal and a third angle of deflection to be rotated for a second image in the second mobile terminal according to a normal image orientation and the first angle of deflection, and then adjusting by rotating the first image in the first mobile terminal according to the second angle of deflection, and adjusting by rotating the second image in the second mobile terminal according to the third angle of deflection, wherein the normal image orientation is opposite to a gravity direction; and the first mobile terminal and the second mobile terminal respectively displaying the adjusted images. The present invention employs gravity sensors to detect the positions of all terminals, and then calculates the angle to be rotated in order to enable the terminal to display the image in normal orientation, next adjust the orientation of the image shown on the user's terminal, such that each user's terminal can display an image in normal orientation, which brings convenience for users in video communications.

It is understood that the application of the exemplary implementations is not limited by the foregoing examples. A person of ordinary skill in the art is able to make modifications or changes based on the foregoing description, and all of these modifications and changes are within the scope of the appended claims of the present application.

What is claimed is:

1. A method for automatically correcting an image orientation in a mobile terminal video communication, the method comprising:
   receiving, via a server,
      first position data identifying an orientation of a first mobile terminal and second position data identifying an orientation of a second mobile terminal;
   comparing, via the server, the first position data and the second position data;
   calculating, via the server, a first angle of deflection between the first mobile terminal and the second mobile terminal based on the comparison of the first position data and the second position data;
   calculating, via the server, a second angle of deflection for a first image displayed on the first mobile terminal, the second angle of deflection being a difference between an angle of a normal orientation of the first image and the first angle of deflection;
   calculating, via the server, a third angle of deflection for a second image displayed on the second mobile terminal, the third angle of deflection being a difference between an angle of a normal orientation of the second image and the first angle of deflection;

sending, via the server, the second deflection angle to the first mobile terminal to rotate the first image by an amount of the second deflection angle; and sending, via the server, the third deflection angle to the second mobile terminal to rotate the second image by an amount of the third deflection angle.

2. The method according to claim 1, wherein the first position data is selected from the group consisting of a left horizontal direction, a right horizontal direction, a vertical direction, and an inverted direction, and wherein the second position data is selected from the group consisting of a left horizontal direction, a right horizontal direction, a vertical direction, and an inverted direction.

3. The method according to claim 1, wherein the receiving the first position data and the second position data further comprises:

receiving, via the server, the first position data identifying the orientation of the first mobile terminal, wherein the first position data is generated based on an output of a gravity sensor of the first mobile terminal; and receiving, via the server, the second position data identifying the orientation of the second mobile terminal, wherein the second position data is generated based on an output of a gravity sensor of the second mobile terminal.

4. The method according to claim 2, wherein the receiving the first position data and the second position data further comprises:

receiving, via the server, a previously identified first position data from the first mobile terminal when the first position data identifies the orientation of the first mobile terminal as a horizontal position; and receiving, via the server, a previously identified second position data when the second position data identifies the orientation of the second mobile terminal as a horizontal position.

5. The method according to claim 1, wherein the first image is an image of a user of the second mobile terminal, and the second image is an image of a user of the first mobile terminal.

6. The method according to claim 2, wherein the left horizontal direction, the right horizontal direction, the vertical direction and the inverted direction are preset directions.

7. A method for automatically correcting an image orientation in a mobile terminal video communication, the method comprising:

establishing, via a first mobile terminal, a video communication with a second mobile terminal;

sending, via the first mobile terminal, first position data identifying an orientation of the first mobile terminal to a server that:

compares the first position data with second position data, received from the second mobile terminal, the second position data identifying an orientation of the second mobile terminal, calculates a first angle of deflection between the first mobile terminal and the second mobile terminal if the comparison indicates different orientations, calculates a second angle of deflection for a first image displayed on the first mobile terminal, the second angle of deflection being a difference between an angle of a normal orientation of the first image and the first angle of deflection, and calculates a third angle of deflection for a second image displayed on the second mobile terminal, the third angle of deflection being a difference between an angle of a normal orientation of the second image and the first angle of deflection; and rotating, via the first mobile terminal, the first image based on the second deflection angle received from the server.

8. The method according to claim 7, wherein the establishing a video communication between the first mobile terminal and the second mobile terminal comprises:

accessing, via the first mobile terminal, a video communication interface via social software;

sending, via the first mobile terminal, a video connection request to the second mobile terminal; and initiating, via the first mobile terminal, the video communication upon detecting that the second mobile terminal has received the video connection request.

9. The method according to claim 8, wherein the first position data is selected from the group consisting of a left horizontal direction, a right horizontal direction, a vertical direction, and an inverted direction, and wherein the second position data is selected from the group consisting of a left horizontal direction, a right horizontal direction, a vertical direction, and an inverted direction.

10. The method according to claim 9, wherein the sending the first position data further comprises:

sending, via the first mobile terminal, the first position data identifying the orientation of the first mobile terminal, wherein the first position data is generated based on an output of a gravity sensor of the first mobile terminal, and sending, via the first mobile terminal, the second position data identifying the orientation of the second mobile terminal, wherein the second position data is generated based on an output of a gravity sensor of the second mobile terminal.

11. The method according to claim 9, wherein the sending the first position data further comprises:

sending, via the first mobile terminal, a previously identified first position data to the server when the orientation of the first mobile terminal is the left horizontal direction or the right horizontal direction.

12. The method according to claim 7, wherein the first image is an image of a user of the second mobile terminal.

13. The method according to claim 9, wherein the left horizontal direction, the right horizontal direction, the vertical direction, and the inverted direction are preset directions.

14. A system for automatically correcting an image orientation in a mobile terminal video communication, the system comprising:

at least one processor; and a memory storing at least one instruction that when executed by the at least one processor causes the at least one processor to:

receive first position data identifying an orientation of a first mobile terminal and to receive second position data identifying an orientation of a second mobile terminal;

compare the first position data with second position data;

calculate a first angle of deflection between the first mobile terminal and the second mobile terminal if the comparison indicates different orientations;

calculate a second angle of deflection for a first image displayed on the first mobile terminal, the second angle of deflection being a difference between an angle of a normal orientation of the first image and the first angle of deflection;

calculate a third angle of deflection for a second image displayed on the second mobile terminal, the third angle of deflection being a difference between an angle of a normal orientation of the second image and the first angle of deflection send the second deflection angle to the first mobile terminal to rotate the first image by an amount of the second deflection angle; and send the third deflection angle to the second mobile terminal to rotate the second image by an amount of the third deflection angle.

15. The system according to claim 14, wherein the memory further stores at least one instruction that when executed by the at least one processor causes the at least one processor to:

select the first position data from a group consisting of a left horizontal direction, a right horizontal direction, a vertical direction, and an inverted direction; and select the second position data from a group consisting of a left horizontal direction, a right horizontal direction, a vertical direction, and an inverted direction.

16. The system according to claim 15, wherein the memory further stores at least one instruction that when executed by the at least one processor causes the at least one processor to:

receive the first position data, wherein the first position data is generated based on an output of a gravity sensor of the first mobile terminal;

receive the second position data, wherein the second position data is generated based on an output of a gravity sensor of the second mobile terminal;

receive a previously identified first position data from the first mobile terminal when the orientation of the first mobile terminal cannot be identified from the first position data; and receive a previously identified second position data from the second mobile terminal when the orientation of the second mobile terminal cannot be identified from the second position data.

17. The system for according to claim 16, wherein memory further stores at least one instruction that when executed by the at least one processor causes the at least one processor to:

receive a previously identified first position data from the first mobile terminal when the first position data identifies the orientation of the first mobile terminal as a horizontal position; and receive a previously identified second position data from the second mobile terminal when the second position data identifies the orientation of the second mobile terminal as a horizontal position.

18. The system according to claim 14, wherein the first image is an image of a user of the second mobile terminal, and the second image is an image of a user of the first mobile terminal.

19. The method according to claim 1, further comprising:

receiving, via the server, a previously identified first position data from the first mobile terminal when the orientation of the first mobile terminal cannot be identified from the first position data; and receiving, via the server, a previously identified second position data from the second mobile terminal when the orientation of the second mobile terminal cannot be identified from the second position data.

20. The method according to claim 7, further comprising:

sending, via the first mobile terminal, a previously identified first position data to the server when the orientation of the first mobile terminal cannot be identified from the first position data; and sending, via the second mobile terminal, a previously identified second position data to the server when the orientation of the second mobile terminal cannot be identified from the second position data.

* * * * *